United States Patent
Bye

(10) Patent No.: US 6,792,363 B1
(45) Date of Patent: Sep. 14, 2004

(54) SYSTEM AND METHOD FOR TRAJECTORY OPTIMIZATION USING ADAPTIVE NAVIGATION PERFORMANCE ESTIMATION

(75) Inventor: Charles T. Bye, Eden Prairie, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/462,790

(22) Filed: Jun. 17, 2003

(51) Int. Cl.[7] .................................................. G05D 1/00
(52) U.S. Cl. ............................................... 702/57; 701/2
(58) Field of Search ................................ 244/3.16, 152; 701/87, 2, 1, 23, 214, 3, 213; 702/57

(56) References Cited

U.S. PATENT DOCUMENTS

| | | | | |
|---|---|---|---|---|
| 5,340,056 A | * | 8/1994 | Guelman et al. | 244/3.16 |
| 5,502,638 A | * | 3/1996 | Takenaka | 701/87 |
| 6,122,572 A | * | 9/2000 | Yavanai | 701/23 |
| 6,377,875 B1 | * | 4/2002 | Schwaerzler | 701/2 |
| 6,498,968 B1 | * | 12/2002 | Bush | 701/3 |
| 6,615,135 B2 | * | 9/2003 | Davis | 701/203 |
| 2002/0055819 A1 | * | 5/2002 | Shimizu | 701/214 |
| 2003/0025038 A1 | * | 2/2003 | Nicolai et al. | 244/152 |

OTHER PUBLICATIONS

Raghunathan et al. "Dynamic Optimazation Strategies for 3D Conflict Resolution of Multiple Aircraft", Aug. 29, 2002, pp. 1–27.

* cited by examiner

Primary Examiner—John Barlow
Assistant Examiner—Victor J. Taylor
(74) Attorney, Agent, or Firm—Shaw Pittman LLP

(57) ABSTRACT

The present invention relates to a method for optimizing a route of a vehicle including planning an initial route using rules to estimate navigation system performance and to enhance accuracy of the navigation system and then utilizing a navigation performance prediction tool to evaluate possible success of the initial route. If the initial route is deemed a failure, estimated error may be recalculated based on the initial route and then the estimated error may be utilized to evaluate possible success of the initial route. If the initial route is deemed a failure, the rules may be used to designate at least one error correcting maneuver to be added to the initial route to reduce error and then the estimated error of the initial route including the error correcting maneuver may then be recalculated using the navigation prediction process. The possible success of the initial route including the error correcting maneuver may then be evaluated. This method may be repeated in whole or in part until a satisfactory route is obtained.

22 Claims, 2 Drawing Sheets

SYSTEM AND METHOD FOR TRAJECTORY OPTIMIZATION USING ADAPTIVE NAVIGATION PERFORMANCE ESTIMATION

BACKGROUND

1. Field of the Invention

The present invention relates generally to trajectory optimization of vehicles, such as airborne vehicles. More specifically, the present invention relates to routing optimization using adaptive navigation performance estimation.

2. Background of the Invention

Uninhabited autonomous vehicles (UAV) are utilized for various purposes in industries such as in the defense industry. These vehicles often travel according to predetermined routes that are often planned in advance using optimization routines that check the potential route for success or failure based on various criteria. UAVs rely mainly on an integrated navigation system for an estimate of their navigation state. When traveling unobstructed, the UAV processes information from global positioning satellites (GPS) and inertial sensors to determine if it is traveling along its prescribed route. If GPS access is lost, for example due to an obstruction, the UAV's navigation system begins operating in the free-inertial navigation solution for guidance.

Unlike the GPS-aided navigation mode, the GPS/Inertial Navigation Systems (INS) in the free-inertial mode can develop unbounded errors over time. GPS errors may increase due to poor satellite visibility. The INS error growth rate is dependent on previous maneuvers while GPS is available and also on maneuvers made after GPS is lost. For example, error growth rate on a straight trajectory is less than error growth rate on a trajectory that includes turns or rapid changes in elevation. The UAV can be directed to make certain maneuvers prior to the loss of GPS to calibrate the inertial sensors, resulting in enhanced performance in areas where GPS is obstructed. In addition, information from a Kalman filter may be used before the flight to predict error bounds, or during the flight in real-time to determine whether or not the UAV is flying within its planned flight corridor.

Traditionally air traffic has been controlled using predetermined routes and flight procedures to ensure sufficient separation between various aircraft as well as to ensure sufficient distance from structures and other obstacles. Today's practices often result in planes moving along a tortuous route from point to point along predetermined corridors.

Recently, the Federal Aviation Administration (FAA) has put forth a concept called free flight that will serve as the operating paradigm for future air traffic control. This change will require new concepts of shared responsibility between controllers and aircraft operators. Currently, controllers assign routes, altitudes, and speeds. Under the new system, aircraft operators can change these parameters in real time. Controllers would only intervene to ensure that aircraft remain at safe distances from one another. The free flight environment will also enable individual aircraft to minimize operating costs. One key to the success of free flight is the detection of conflicts and determination of appropriate strategies for resolving conflict among aircraft.

In addition to free flight used in commercial aviation, route planning systems are in place that plan predetermined routes for UAVs or vehicles with automated piloting systems that may travel low to the ground and thus encounter many obstacles. In this application, route planning is specifically described in regard to airborne vehicles. The route planning process described herein, however, may be applicable to any vehicle capable of traveling along a predetermined route and is not limited solely to aircraft.

Current systems develop a flight plan and utilize a fixed estimated error that estimates errors due to factors such as, for example flight technical error, wind, and navigation error, to determine if the proposed route will be a success. All errors may be specified statistically. For example, the expected position error is often set at 10 m (Spherical Error Probable (SEP)). As used in this application, fixed estimated error denotes a single error factor estimated in advance and used throughout a route performance evaluation to determine success or failure of the route. Estimated error, or error factor, in general denotes potential deviation from the predetermined route. For example, a specific error factor would provide a buffer zone around the predetermined route. If an obstacle were to fall within that buffer, the route would be deemed a failure. The smaller the error factor, the smaller the buffer.

If the route fails, that is an obstacle falls within the fixed estimated error or buffer zone, the route is recalculated to ensure that all obstacles will be avoided. Because the error factors used in these calculations are merely estimations, it may be possible that a craft could actually navigate a route that does not pass the failure analysis, but because the perceived likelihood of a collision is too high, that route is not chosen. This results in a recalculation of the route and often means a longer and more costly flight path. Thus, there is a need for a trajectory planning system capable of determining flight paths for free flight as well as optimizing predetermined routes for unmanned aircraft that minimizes the error used. In the invention this is achieved by dynamically estimating the error.

BRIEF SUMMARY OF THE INVENTION

According to one aspect of the invention, a method for optimizing a route of a vehicle includes planning an initial route using rules to estimate navigation system performance, wind error, flight technical error, and to enhance accuracy of the navigation system and then utilizing a navigation performance prediction tool to evaluate possible success of the initial route. The error may be calculated by dynamically estimating the error and utilizing the dynamic error estimate to evaluate possible success of alternate routes. If the initial route is deemed a failure, the rules may be used to designate at least one error correcting maneuver to be added to the initial route to reduce error and then the error of the initial route including the error correcting maneuver may then be recalculated using the navigation prediction process to compute the dynamic estimated error. The possible success of the initial route including the error correcting maneuver is therefore evaluated. The methods of alternate routes and error correcting maneuvers may be repeated in whole or in part until a satisfactory route is obtained. Alternately, the dynamic error estimate could be computed concurrently with the computation of the initial route with the rules rather than computing the dynamic error estimate after the initial route has been completely defined Additionally, during an actual mission, the navigation system may, in real-time, dynamically compute its estimate of the system's navigation error. The estimated error may be compared to the allowed navigation, flight technical, and wind errors for each segment of the mission. If the estimate of the real-time dynamic estimated error exceeds the allowed error then the route is dynamically re-planned to ensure that the vehicle travels through a flight corridor that is wide enough to allow for the estimated navigation, flight technical, and wind errors that will occur in that corridor. Alternatively, the system may add error correcting maneuvers to calibrate the navigation system so that the error does not exceed the allowed error for that corridor.

DETAILED DESCRIPTION OF THE INVENTION

Figure 1:
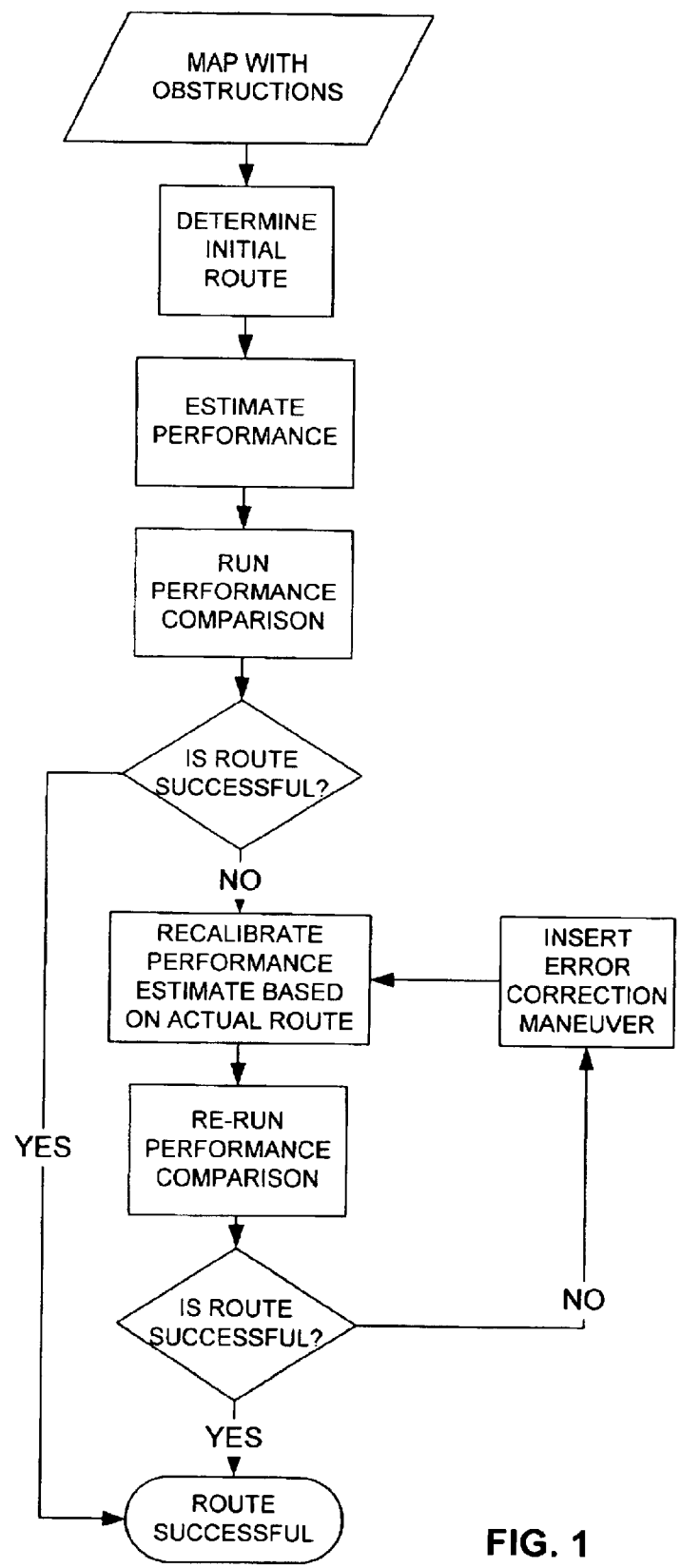
FIG. 1 is a flow chart depicting an optimization routine for planning a predetermined route.

As mentioned above, current trajectory planning systems utilize a fixed estimated error factor, or estimate, to determine if a proposed route will result in a success or failure. This often results in recalculation of a route that could actually result in a successful mission, but not with high enough probability to take the chance of accepting that route. By utilizing a dynamic error adjustment in the route planning analysis, flight paths that might otherwise be rejected could be utilized, resulting in shorter, more efficient routes.

Traditionally a route is planned between two points via the most efficient route that provides a path that is wider than the fixed error estimate. The optimization planner generates a proposed trajectory, or route. To ensure a successful flight, these fixed estimated errors are often required to be conservative and therefore potentially successful routes are avoided because of an undesirably high probability of failure based on the fixed estimated error. By utilizing dynamic estimated error computations, error correcting maneuvers, and dynamic error checking, a route that may be considered a failure under traditional analysis could be successful. The dynamic error estimate may also be computed concurrently with the route rather than being computed after the route has been determined.

Error tends to build up as a craft proceeds along a given route. Traditional error calculations continue to accumulate this error and utilize a value that represents the optimistic, typical, or maximum error that may be encountered over the course of a flight. This may result in a route that causes a collision or inefficient route planning. For example, if a certain error bound is used throughout a given flight path, it is likely that the craft may actually experience a lower or higher error value during its flight path. For example, during the early part of the flight the error is usually small and therefore less than the fixed estimated error. The dynamic estimated error might allow the craft to proceed along a certain route that is deemed not navigable by the route planner using a fixed estimated error bound. As used herein, the predicted or dynamically estimated error refers to a prediction of estimated error at any point along a route, as opposed to fixed estimated error which is merely an overall estimate whereby the same error estimate is used throughout the route. By dynamically predicting estimated error at various points along the flight path, tighter error factors may be used.

For example, as long as a craft maintains contact with GPS navigation satellites, its deviation from a predetermined route will typically remain relatively low. If, however, the craft begins traveling through an area where GPS reception is obstructed for one or more satellites, the error may begin to accumulate in the navigation position estimate. The longer the craft is out of contact with one or more GPS navigation satellites, the larger the deviation may become.

In some cases, a craft may reacquire the GPS signal from one or more GPS satellites at various points along its flight path, thus enabling the craft to reduce its error and return to a route close to the predetermined, or planned, route. In addition, by performing predetermined flight maneuvers when the craft is receiving signals from one or more GPS satellites, the craft may further recalibrate its position, thus reducing the actual error and thus the dynamic estimated error. Without such error correcting maneuvers, errors can continue to build up potentially rendering the route a failure.

One manner of achieving this error correction would be to insert, at various points along the flight path, correcting maneuvers to aid in reducing errors in the INS and allowing the craft to return a route closer to the predetermined route. Most likely, these maneuvers would be performed at a point just before the craft enters a blackout area where the vehicle will no longer receive some of the GPS satellite signals, thus placing the craft as close to the preplanned route (zero error) as possible, or at least reducing accumulated error enough to allow the craft to pass through the upcoming blackout area. By eliminating as much error as possible, the craft begins its route through the blackout area with the most accurate estimate of the navigation state (e.g. position) and sensor error estimates possible.

From a trajectory planning standpoint, such a flight path may be achieved by using traditional route planning software to determine an initial route with the addition of a set of rules to predict the estimated error in the trajectory or by computing the dynamic estimated error at each step along the route as it is planned. Either or both the rule and the concurrent prediction of the dynamic estimated error can be used during the planning of the route. If the dynamic estimated error method is not computed concurrently with the route planning, the planned route is then compared versus a performance evaluator, which computes the dynamically estimated error, which takes into account the error that may accumulate over the route due to loss of GPS satellite visibility, inertial sensors errors, or other sources. As with other planning methods, if the route is successful it is used. Unlike other methods, however, if the route is unsuccessful, it is not necessarily deemed a failure. Instead, the route is reanalyzed with the above-mentioned dynamic error correction and potentially implementing additional error correcting maneuvers as part of the route. Of course, the optimizer may choose other routes.

As stated above, it may not be necessary for any route correcting maneuvers whatsoever. The route itself may have certain areas that will allow for the desired error correction without any additional maneuvers. For example, if the craft needs to navigate through a series of obstacles and then emerges into an extended area of unobstructed operation, the period of time during which the craft flies unobstructed may be sufficient for it to reacquire GPS assistance and to return to the predetermined route. In such cases, the route itself would have built in error correction so that no additional maneuvers are necessary.

Either way, the system of the present invention would reevaluate the proposed flight path and evaluate the dynamically estimated error to determine if the route would be successful. If the proposed route is re-run utilizing dynamically estimated error based on the ability of the craft to reacquire GPS assistance rather than utilizing a fixed estimated error over the entire route, the previously rejected path may be found to be a success. If the path is still found to be unsuccessful, then the proposed error correction maneuvers may be added to the route to further reduce estimated error as needed. Maneuvers such as turns, circles, figure eights, etc. carry with them known factors of error correction. Insertion of these maneuvers reduces error at various points along the route as necessary, thus allowing the craft to navigate through the most efficient path. If the corrective maneuvers fail then portions of the route may have to be re-planned to avoid the areas where the conflicts occurred.

FIG. 1 depicts an optimization process that utilizes predicted error to optimize route planning. Initially, a map with various obstructions, obstacles, zones of diminished GPS assistance, and other pertinent information is used to develop an optimal flight path using waypoints and other high level trajectory information. The computed route may include waypoints and velocity and attitude data or a detailed trajectory including inertial data (delta angles and velocity) plus information related to the availability of the sensor data. This flight path is then run through a performance estimator that calculates a dynamically estimated error over the entirety of the route.

The route is then evaluated for success or failure based on the route and the various waypoints along the route. The output of the evaluation is the estimated error. The method for computing this performance may be, for example, a covariance analysis program. If found successful, the route planning is completed and the route is available for use.

If the route is found to be a failure, the route is then recalculated based on the craft's estimated ability to recalibrate the GPS/INS navigation system at various points along the route, which determines a new dynamically estimated error. Over the route, the suggested maneuvers are provided to generate improvements in navigation accuracy based on heuristic rules that can be used to improve the navigation performance. Based on the results of the navigation performance (e.g. dynamically estimated error), which includes violations, or potential for collision, the route may be returned to the route/trajectory planner. If violations remain and the route is still unsuccessful, then additional maneuvers may be inserted into the flight plan to improve the route and to further reduce the error. This loop of adding error correction maneuvers is performed until the route is found to be successful, or eventually unsuccessful if all possible error correcting maneuvers and alternate routes are exhausted.

It may be possible that the number of correction maneuvers reaches a point where an alternate route requiring fewer correction maneuvers is desirable. In such a case, the optimization routine may involve a check versus other alternate routes (e.g. the second-best route) to ensure that the error correction maneuvers do not actually cause the route to become suboptimal.

In addition to predetermined route planning, the present invention may be utilized in dynamic route planning. As described above, the error, as measured by the navigation system, experienced by a UAV may exceed the dynamically estimated error used to plan the predetermined route. If this should happen, a similar process may be used during the mission to change the route so that it remains within parameters defining success. Such unexpected error may occur for various reasons including, for example, an error rate above the expected error rate due to unexpected GPS outages that cause the craft to rely more heavily on the inertial sensors rather than on the GPS data than was expected by the route planner.

The dynamic navigation performance estimation function, which computes the real-time dynamic estimated error, uses the covariance information (e.g. position, velocity, and attitude covariances) from the navigation system's Kalman filter. The process used in dynamic route planning during the mission is capable of checking the flight corridor width and height against the real-time dynamically estimated error in the navigation system to ensure that the vehicle stays within its allowed flight corridor. This route re-planning could be done onboard if the craft has such capability, or it could be done remotely and transmitted to the craft.

Figure 2:
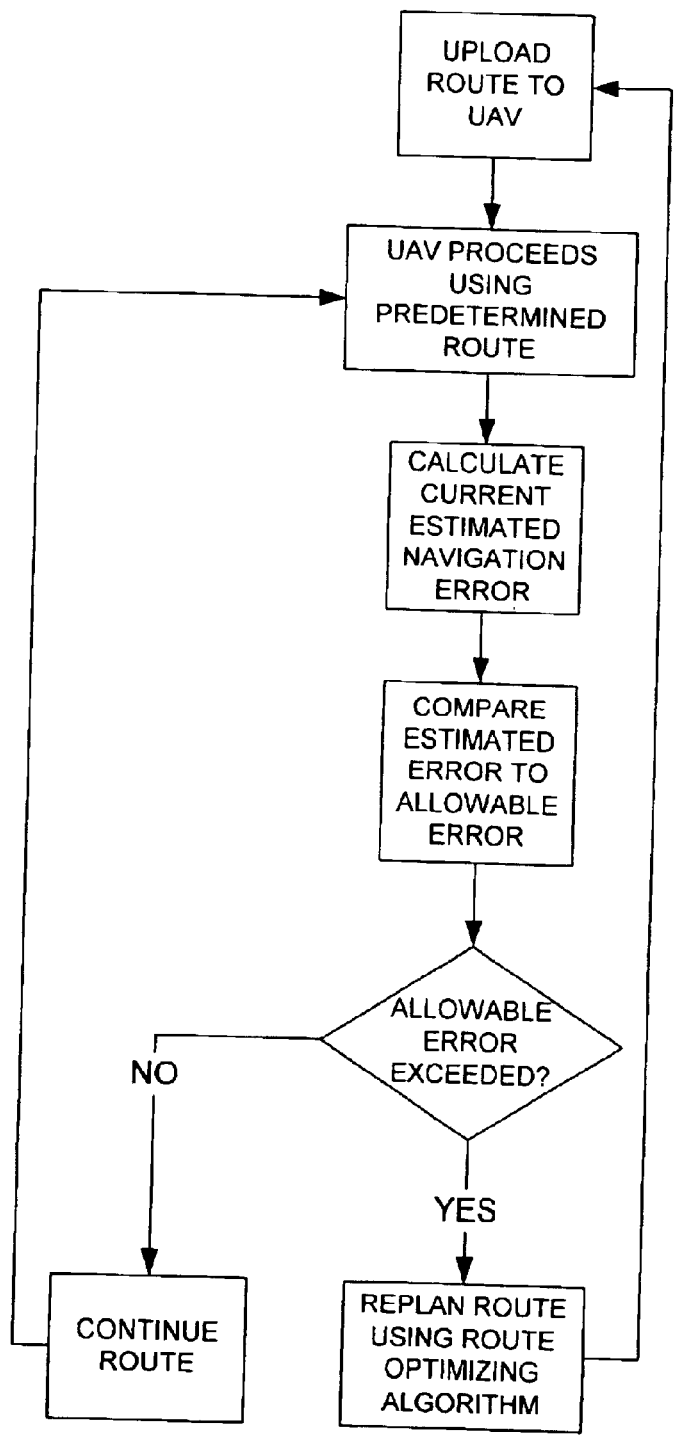
FIG. 2 is a flow chart depicting an optimization route for dynamically planning a route.

As seen in FIG. 2, a predetermined route plan, which may be planned according to methods described herein or by any other route planning method, is uploaded to a UAV. The UAV then begins to travel along the predetermined route. The system may then check real-time dynamically estimated error versus predicted error to ensure that the UAV maintains an acceptable error bound. This check of real-time dynamically estimated error versus predicted error may occur at any time during the route. If at any time during the route, the system determines that real-time dynamically estimated error is exceeding the estimated acceptable error, the system may enter a dynamic planning mode to reroute the UAV. This dynamic planning may be done on board the UAV or it may be done remotely and transmitted to the UAV.

During the dynamic planning, the route may be re-planned according the process shown in FIG. 1. This may include adding error correcting maneuvers or it may involve rerouting the UAV along a different corridor that involves a greater likelihood of success. The changes to the route may include, for example, minor detours, addition of error correcting maneuvers, or may entirely reroute the craft on a separate route from the originally planned route.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for optimizing a route, comprising:
   planning a route;
   determining threshold distances from obstacles along the route;

computing dynamically estimated error at one or more points along the route to analyze the route for violation of the threshold distances;

if a violations occurs, determining the one or more points at which the violations occurred; and adding at least one error correcting maneuver to the route to reduce actual predicted accumulated error and reanalyzing the route for violation of the threshold distances.

2. The method of claim 1, further comprising repeating the method until no violations are found.

3. The method of claim 1, wherein the dynamically estimated error is computed using a navigation covariance analysis program.

4. The method of claim 3, wherein the navigation covariance analysis program includes a Kalman filter.

5. The method of claim 1, wherein the vehicle is at least one of an aircraft, a land vehicle, and a water craft.

6. A method for optimizing a route of vehicle, comprising:

planning an initial route;

utilizing a fixed estimated error to evaluate possible success of the initial route;

then computing the dynamically estimated error for the initial route at one or more points;

if the initial route is deemed a failure, determining at least one location that caused the failure; and adding at least one error correcting maneuver to the initial route to reduce dynamically estimated error and evaluating the initial route with the at least one error correcting maneuver added for possible success.

7. The method of claim 6, further comprising repeating the method until a successful route is obtained.

8. The method of claim 6, wherein the dynamically estimated error is computed using a navigation covariance analysis program.

9. The method of claim 8 wherein the navigation covariance analysis program includes a Kalman filter.

10. The method of claim 6, wherein the vehicle is at least one of an aircraft, a land vehicle, and a water craft.

11. A method for optimizing a route of a vehicle, comprising:

planning an initial route;

utilizing a fixed estimated error;

recalculating the error based on the initial route;

utilizing the dynamically estimated error to evaluate possible success of the initial route;

if the initial route is deemed a failure, adding at least one error correcting maneuver to the initial route to reduce error;

recalculating the dynamically estimated error of the initial route including the at least one error correcting maneuver; and evaluating possible success of the initial route including the at least one error correcting maneuver.

12. The method of claim 11, further comprising repeating the method until a successful route is obtained.

13. The method of claim 11, wherein the vehicle is at least one of an aircraft, a land vehicle, and a water craft.

14. The method of claim 11, wherein the dynamically estimated error is computed using a navigation covariance analysis program.

15. The method of claim 14, wherein the navigation covariance analysis program includes a Kalman filter.

16. A method for controlling a vehicle, comprising:

uploading a predetermined route to the vehicle;

before or while the vehicle is in motion, comparing real-time dynamically estimated error to a pre-computed variable error;

if the real-time dynamically estimated error exceeds the pre-computed variable error, re-planning the route of the vehicle utilizing a route planning optimization process; and if the real-time dynamically estimated error is less than the pre-computed error, allowing the vehicle to continue along the predetermined route.

17. The method of claim 16, wherein the re-planning occurs at the vehicle.

18. The method of claim 16, wherein the dynamically estimated error is computed using a navigation covariance analysis program.

19. The method of claim 18, where the navigation covariance analysis program includes a Kalman filter.

20. The method of claim 16, wherein the dynamically estimated error is computed using a navigation estimation filter.

21. The method of claim 20, wherein the navigation estimation filter comprises a Kalman filter.

22. The method of claim 16, wherein the re-planning is done remotely and a new route is transmitted to the vehicle.

* * * * *